United States Patent
Wang et al.

(10) Patent No.: US 8,891,018 B1
(45) Date of Patent: Nov. 18, 2014

(54) EDGE DETECTION IN A VIDEO FIELD

(71) Applicant: Amlogic Co., Ltd., Santa Clara, CA (US)

(72) Inventors: Dongjian Wang, San Jose, CA (US); Xin Hu, Shanghai (CN); Xuyun Chen, San Jose, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 0 days.

(21) Appl. No.: 14/012,971

(22) Filed: Aug. 28, 2013

(51) Int. Cl.
  *H04N 7/01* (2006.01)
  *H04N 11/20* (2006.01)
  *H04N 5/21* (2006.01)
  *H04N 7/00* (2011.01)
  *H04N 5/14* (2006.01)

(52) U.S. Cl.
  CPC .............. *H04N 7/007* (2013.01); *H04N 5/142* (2013.01)
  USPC ............ 348/627; 348/448; 348/625; 382/266

(58) Field of Classification Search
  USPC ................. 348/606, 625–631, 448–452, 458; 382/199, 266–269
  See application file for complete search history.

(56) References Cited

U.S. PATENT DOCUMENTS

| | | | |
|---|---|---|---|
| 7,075,580 B2 * | 7/2006 | Jiang | 348/448 |
| 2007/0103485 A1 * | 5/2007 | Lu et al. | 345/606 |
| 2011/0249901 A1 * | 10/2011 | Zhong et al. | 382/199 |

\* cited by examiner

*Primary Examiner* — Michael Lee
(74) *Attorney, Agent, or Firm* — Venture Pacific Law, PC

(57) ABSTRACT

A method for detecting edges in a video field, comprising the steps of: selecting edges for a pixel of the video field; determining sum of absolute differences ("SAD") values for the selected edges; determining inverse SAD ("ISAD") values for the selected edges; and detecting one or more certain ones of the selected edges as a valid edge as a function of the determined SAD values and the determined ISAD values.

13 Claims, 6 Drawing Sheets

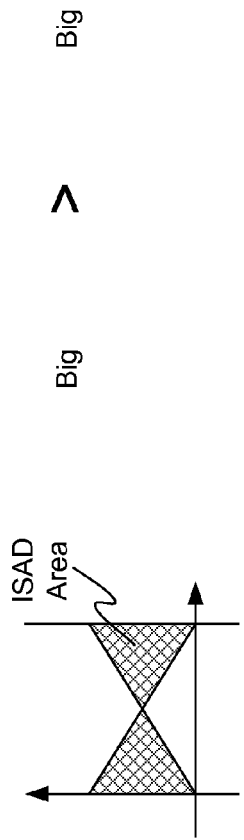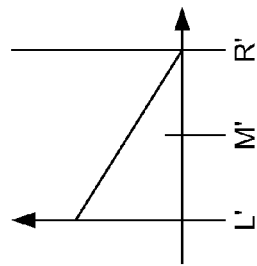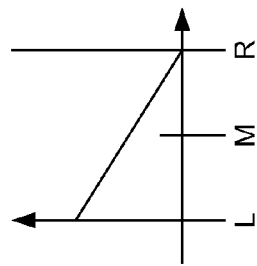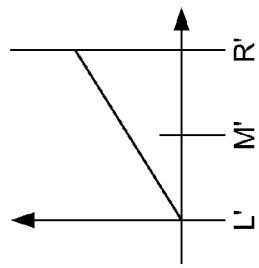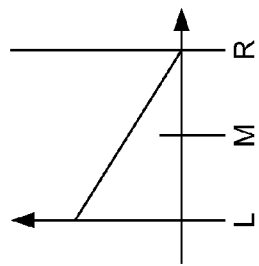

EDGE DETECTION IN A VIDEO FIELD

FIELD OF INVENTION

This invention generally relates to video processing, and, in particular, to edge detection for a pixel in a video field.

BACKGROUND

Video frames are typically encoded in an interlaced format comprising a first video field (e.g., a top video field) and a second video field (e.g., a bottom field), each video field having alternating lines of the video frame and each field being temporally separated. Video images are typically encoded and transmitted to a receiver in such an interlaced format as a compromise between bandwidth and video image resolution. Since interlaced video frames are displayed using only half the lines of a full video frame, less system bandwidth is required to process and display these video frames. However, since the human eye typically cannot resolve a single video field, but rather, blends the first field and the second field, the perceived image has the vertical resolution of both fields combined.

Some types of receivers, including computers, televisions, mobile phones, computing tablets, etc., may require the use of de-interlaced video frames instead of interlaced video frames. For such receivers, the video frames encoded in an interlaced format must be de-interlaced prior to display. Typically, any missing pixels from the video frame are interpolated using the pixels of the first video field and the second video field.

There are several well-known methods to construct de-interlaced video frames. One such method is commonly referred to as the "bob" method in which a de-interlaced video frame is constructed from a single video field that is vertically interpolated. One drawback of this method is that objects within a scene that have diagonal or round edges are often incorrectly interpolated. This is due to the fact that vertical interpolation generally does not try to preserve edge information, but rather simply interpolates between a line above and a line below the missing line in the video frame. The resulting interpolated diagonal edges or round objects appear as stair steps, as opposed to smooth edges, and, thus, tend to decrease picture quality.

Several well-known techniques attempt to correct this drawback in the bob method by trying to preserve edge information. One such approach attempts to determine the edge of an object by correlating video data within a 3×3 pixel window (other versions of this approach may use other sized pixel windows, such as a 5×3 or 7×3 pixel window). Specifically, pixel data from the top line of the window is correlated with pixel data from the bottom line in order to determine a horizontal shift between the top and bottom lines. The horizontal shift is assumed to coincide with the edge.

Upon determining the edge of an object within the pixel window, pixels for the missing field may be constructed by interpolating along the determined edge. This approach, however, is relatively sensitive to noisy video data that has relatively greater amounts of intensity transitions due to either picture content or encoding errors. A video field with noisy data may produce false edges that, in turn, causes erroneous interpolation of pixels to be produced. Furthermore, this approach often fails to find edges when there are no obvious correlations among the pixels within the pixel window.

Therefore, it would be desirable to provide new systems and methods for edge detection in a video field that have greater accuracy.

SUMMARY OF INVENTION

An object of this invention is to provide methods for edge detection in a video field that have improved accuracy for edge detection.

Another object of this invention is to provide methods for edge detection in a video field with low calculation complexity.

Yet another object of this invention is to provide methods for edge detection in a video field that account for various edge cases.

Briefly, the present invention discloses a method for detecting edges in a video field, comprising the steps of: selecting edges for a pixel of the video field; determining sum of absolute differences ("SAD") values for the selected edges; determining inverse SAD ("ISAD") values for the selected edges; and detecting one or more certain ones of the selected edges as a valid edge as a function of the determined SAD values and the determined ISAD values.

An advantage of this invention is that methods for edge detection in a video field are provided that have improved accuracy for edge detection.

Another advantage of this invention is that methods for edge detection in a video field are provided with low calculation complexity.

Yet another advantage of this invention is that methods for edge detection in a video field are provided that account for various edge cases.

DESCRIPTION OF THE DRAWINGS

The foregoing and other objects, aspects, and advantages of the invention can be better understood from the following detailed description of the preferred embodiment of the invention when taken in conjunction with the accompanying drawings.

FIGS. 5a-5d illustrate charts of the present invention for determining a valid edge.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Figure 1:
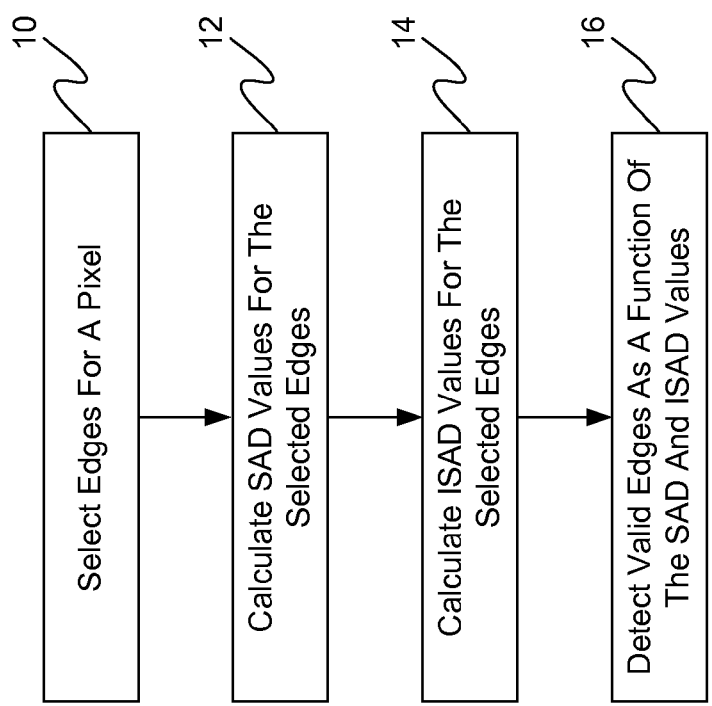
FIG. 1 illustrates a flow chart of the present invention for detecting edges in a video field.

FIG. 1 illustrates a flow chart of the present invention for detecting edges in a video field. An edge can be detected in a video field for use in pixel interpolation of the video field. First, a set of edges for a pixel to be interpolated can be selected 10. The number of edges to be selected for the pixel can be determined based on the system constraints, performance requirements, and/or other factors. Typically, the more edges selected for the pixel, the more power, time, and computational resources are needed for detecting one or more edges for the pixel.

Next, sum of absolute difference ("SAD") values are calculated 12 for the selected edges. In an example, the pixel to be interpolated is located at an x-position along a horizontal axis of the video field and a y-position along a vertical axis of the video field. A SAD value can be calculated for each of the selected edges e about the pixel (in other words, intersecting the pixel to be interpolated) by the following equation:

$$SAD(y,x,e)=|Y(y-1,x+e-d)-Y(y+1,x-e-d)|+2*|Y(y-1,x+e)-Y(y+1,x-e)|+|Y(y-1,x+e+d)-Y(y+1,x-e+d)| \quad \text{Equation [1]}$$

where d can be the filter range and the Y(a,b) function is the luma value for a particular pixel at the location a by b in the video field. The filter range can be a window in the video field set around the pixel to be interpolated. For instance, the y−1 pixel line and the y+1 pixel line can be the upper and lower boundary of the window for all filter ranges, and the left and right boundaries of the window can be set by the edges e. Furthermore, if d=2, then the edges e can span from −4 to 4, inclusively; if d=3, then edges e can span from −6 to 6, and vice versa; if d=4, then the edges e can span from −8 to 8, and vice versa; etc.

Generally, the pixel to be interpolated is between a first line of pixels in the video field, located at y−1, and a second line of pixels of the video field, located at y+1. However, it is understood that additional lines (and buffers for those lines) can be used to improve the accuracy of the edge detection and incorporated into the SAD calculations.

The calculated SAD values for the selected edges can be identified as possible edges in order of minimum to maximum, with the edge having the smallest SAD value being the likeliest. Typically, the minimum of the SAD values are selected as the edge for interpolation. Alternatively, multiple ones of the selected edges can be used for interpolation. However, without further confirmation there can be false positives for the edge based upon the content of the video field or some error with the video data.

Thus, the next step is to calculate inverse SAD ("ISAD") values for the selected edges. An ISAD value can be calculated for each edge about the pixel to be interpolated by the following:

$$ISAD(y,x,e)=|Y(y-1,x+e-d)-Y(y+1,x-e)|+|Y(y-1,x+e)-Y(y+1,x-e+d)|+|Y(y-1,x+e)-Y(y+1,x-e-d)|+|Y(y-1,x+e+d)-Y(y+1,x-e)| \quad \text{Equation [2]}$$

Therefore, for each of the selected edges, there is a SAD value and an ISAD value. To simplify the disclosure, FIG. 1 has the SAD values calculated before the ISAD values. However, it is important to note that the ISAD values can be calculated before the SAD values or calculated concurrently with the SAD values.

Next, valid edges are detected as a function of the SAD values and the ISAD values 16. For instance, for each of the selected edges, if the SAD value of that edge is less than the ISAD value of that edge multiplied by a constant α, then the edge can be confirmed as a valid edge. The constant α can be typically less than one. Generally, the smaller the value of the constant α is, the more strict the condition is for a valid edge detection. The constant α can be programmable and adjusted as needed by the system. This comparison is performed on all of the selected edges to determine which ones of the selected edges are valid edges or invalid edges.

The valid edges are stored 18 in a list of edge candidates for interpolation of the pixel. Depending on the needs of the interpolation algorithm, if more than one valid edge is in the list of edges, then the edge having the minimum SAD value can be used as the edge for interpolation.

Figure 2:
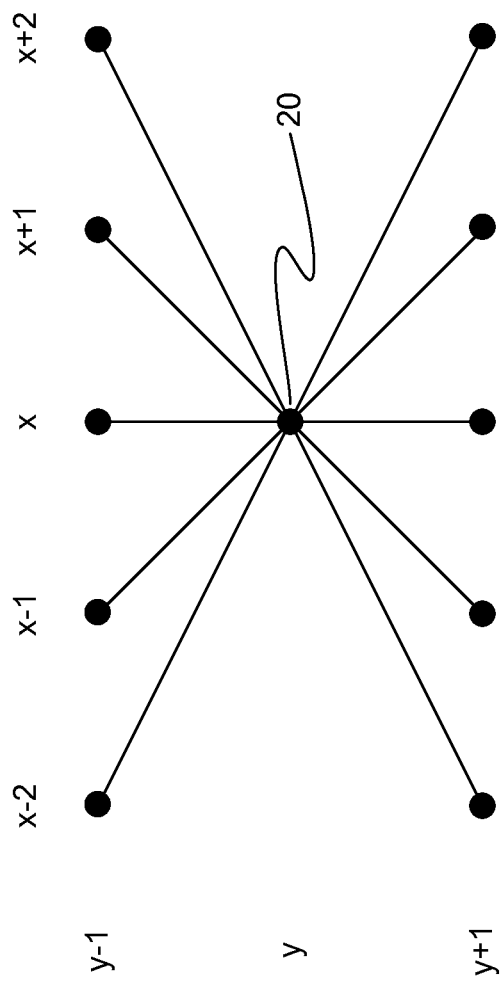
FIG. 2 illustrates a diagram having several edges about a pixel.

FIG. 2 illustrates a diagram having several edges about a pixel to be interpolated. A pixel 20, located in row y and column x of a respective video field, may need interpolation. For ease in reference, the pixel 20 location can be denoted (x,y). In order to improve interpolation, one or more edges can be determined about the pixel 20 to aid in the interpolation of the pixel 20. Typically, edges are lines that run through the pixel 20 to other pixels of the video field. For instance, a first edge can run between points located at (x−2, y−1) and located at (x+2, y+1), and through the pixel 20; a second edge can run between points located at (x−1, y−1) and located at (x+1, y+1), and through the pixel 20; a third edge can run between points located at (x, y−1) and located at (x, y+1), and through the pixel 20; a fourth edge can run between points located at (x+1, y−1) and located at (x−1, y+1), and through the pixel 20; and a fifth edge can run between points located at (x+2, y−1) and located at (x−2, y+1), and through the pixel 20.

The number of edges to use can depend on the system constraints and performance requirements. A filter can be applied to limit the number of edge to a predefined number. For instance, the filter can range from [x−2:x+2] along the horizontal axis of the video field, such that the selected edges for detecting valid edges can be the five lines illustrated in FIG. 2.

Figure 3A:
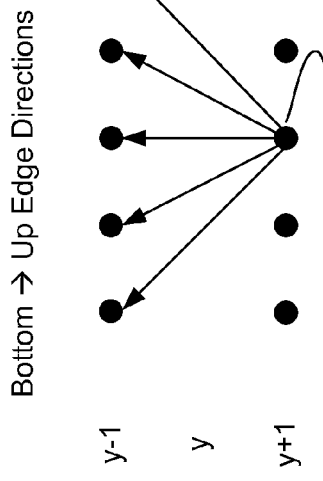
FIGS. 3a-3c illustrate various edge formats.
Figure 3B:
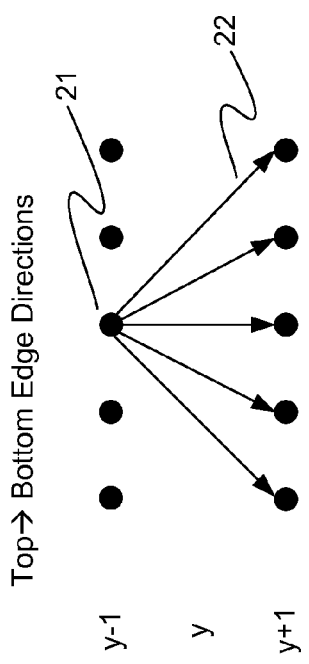

FIGS. 3a-3b illustrate various edge formats. Various edge formats can be used in conjunction with the present invention. It is understood by a person having ordinary skill in the art that Equation [1] and Equation [2] can be amended to support various edge formats, including using angels rather than line and/or vector formats for the edges.

FIG. 3a illustrates a top-bottom edge format. In the top-bottom edge format, a top row y−1 of the video field can have a pixel 21 at which various edges 22 can stem from, and intersect pixels located at the bottom row y+1 of the video field.

FIG. 3b illustrates a bottom-top edge format. In the bottom-top edge format, a bottom row y+1 of the video field can have a single pixel 23 at which various edges 24 can stem from, and intersect pixels located at the top row y−1 of the video field.

Figure 3C:
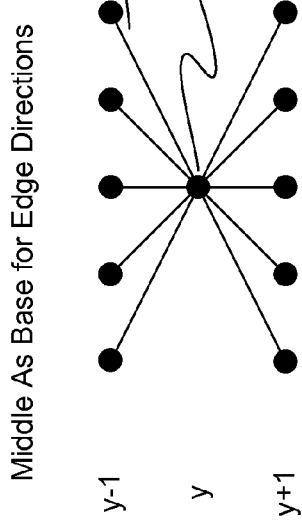

FIG. 3c illustrates a middle-as-base edge format. In the middle-as-base edge format, the edges 26 are lines between the top row y−1 of the video field and the bottom row y+1 of the video field that interest a pixel 25 to be interpolated.

FIGS. 3a-3c illustrates edge formats that use only three adjacent rows of the video field to form the edges. However, it is understood by a person having ordinary skill in the art that edges of the present invention can span any number of rows or columns of the video field.

Figure 4:
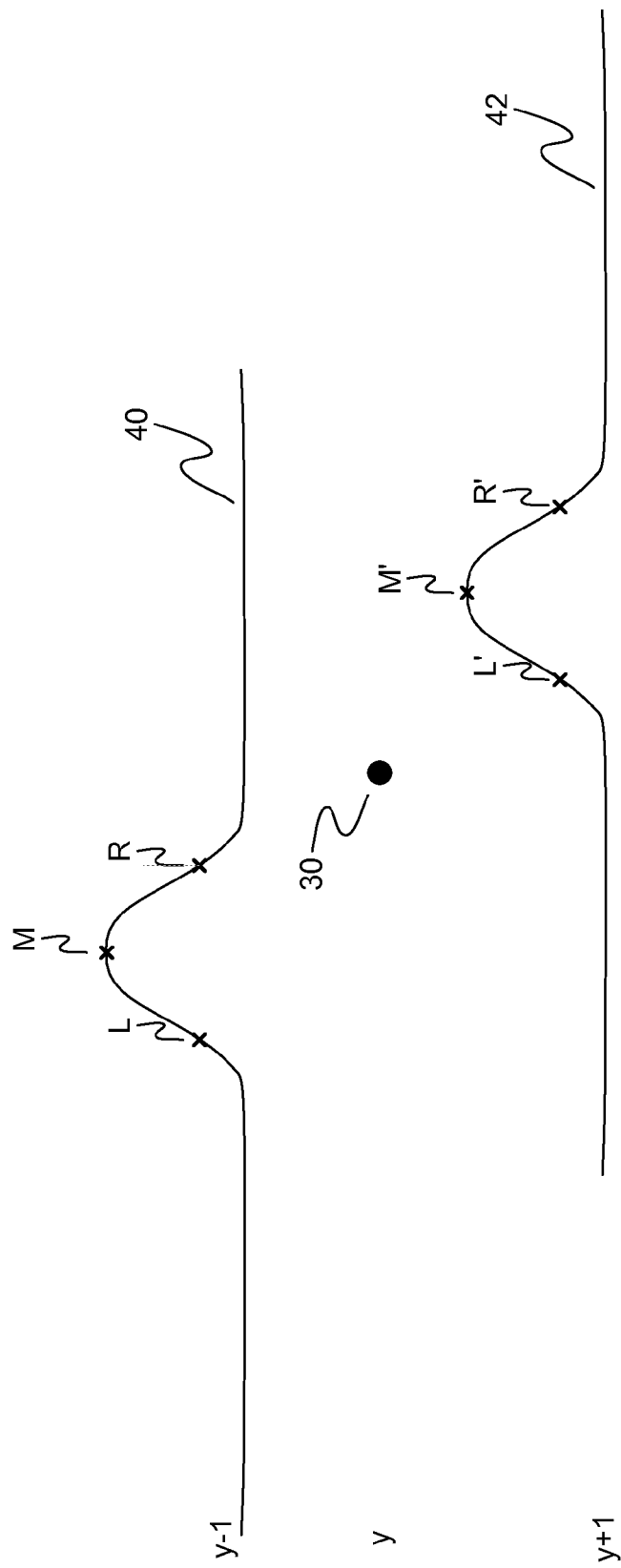
FIG. 4 illustrates a diagram of the present invention for generating SAD and ISAD values for a particular edge.

FIG. 4 illustrates a diagram of a luma curve for two rows of pixels in a video field. In an example of luma curves, a pixel 30 for interpolation can be located at row y of the video field. An edge can be selected, forming a line between a pixel M, located in row y−1, and a pixel M', located in row y−1. The luma values for pixels in the same row as the pixel M can be plotted to form a top luma curve 40 for the selected edge. The luma values for pixels in the same row as the pixel M' can be plotted to form a bottom luma curve 42 for the selected edge. In the top luma curve 40, the luma value at the pixel M is larger than the luma values at pixels L and R. In the bottom luma curve 42, the luma value at the pixel M' is larger than the luma values at pixels L' and R'.

Theoretically, the SAD and ISAD calculations compare the difference in the top luma curve and the bottom luma curve to determine whether an edge may or may not be a valid edge of the video field. It is also understood by a person having ordinary skill in the art that other video characteristics can be used for calculating SAD and ISAD calculations for edge detection using the methods of the present invention. For instance, chroma data for the video field can be used to determine whether an edge may or may not be a valid edge of the video field. However, to aid in the understanding of the current invention, luma data for the video field can be used as an example for generating SAD and ISAD calculations.

If a selected edge is defined to be the line from the pixel M to the pixel M', then a SAD value and an ISAD value can be calculated for the edge using the top luma curve 40 and the bottom luma curve 42 for the edges. In particular, a SAD value for the selected edge can equal |L−L'|+|M−M'|+|R−R'|. An ISAD value for the selected edge can equal |M−L'|+|L−M'|+|M−R'|+|R−M'|. The SAD and ISAD values can be compared to determine whether the selected edge is valid.

FIGS. 5a-5d illustrate charts of the present invention for determining whether an edge is valid. Typically, combinations of a top luma curve and a bottom luma curve may fall into one of four common cases. Although, other cases may be exist, a person having ordinary skill in the art can account for other cases using the below listed four common cases.

Figure 5A:
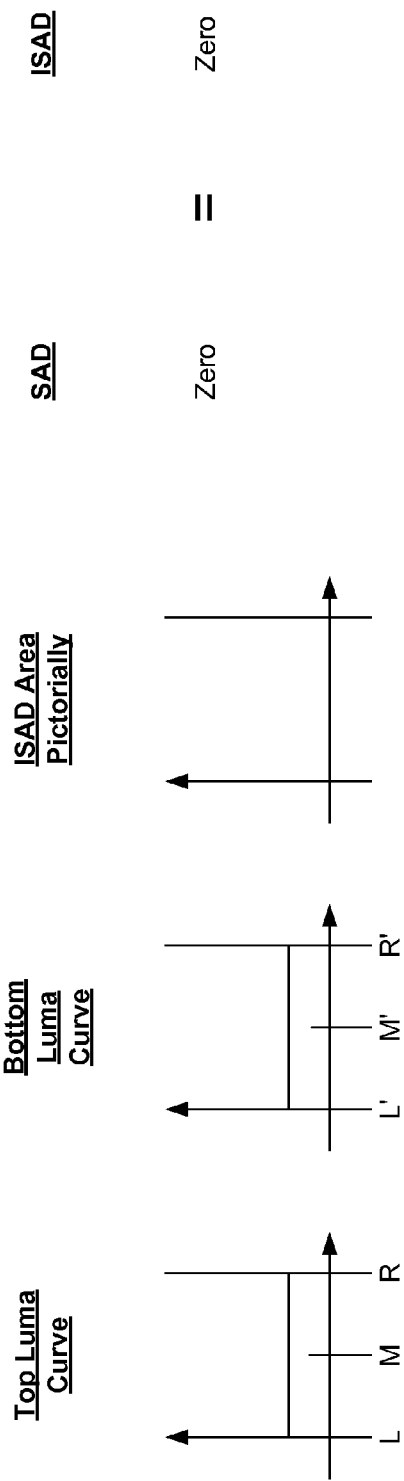

FIG. 5a illustrates a first case where the top luma curve is a horizontal line with a slope substantially equal to zero and where the bottom luma curve is a horizontal line with a slope substantially equal to zero. The SAD value is roughly equal to zero, and the ISAD value is also roughly equal to zero. Thus, the SAD value and the ISAD value are relatively equal to each other. For such case, the respective edge for the top luma curve and the bottom luma curve will not be added as a possible edge for pixel interpolation because the confidence level may be low even though the SAD value is small.

Figure 5B:
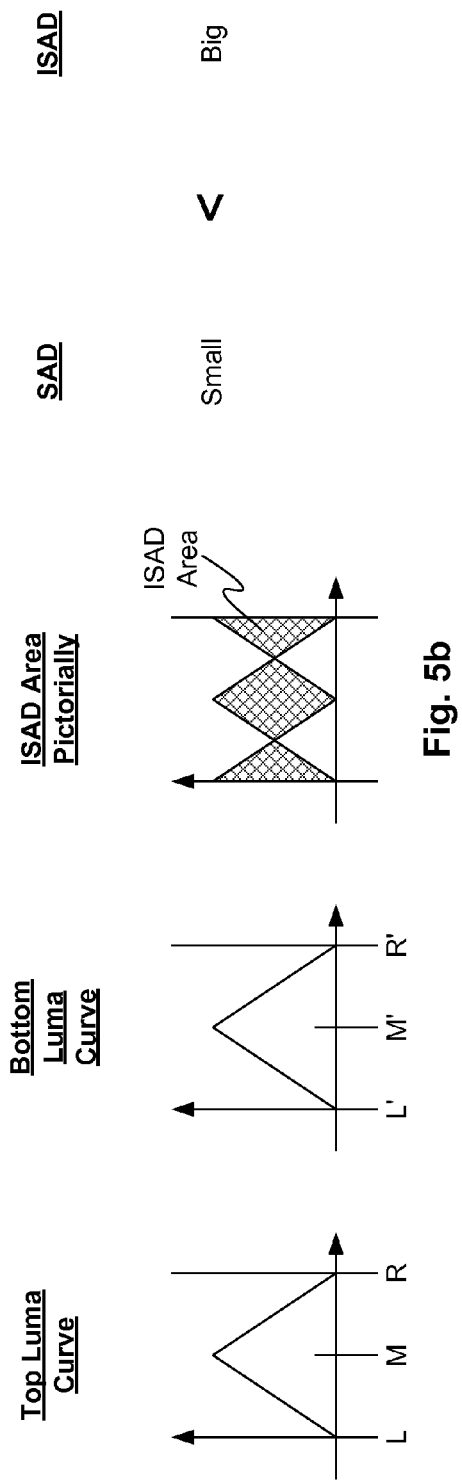

FIG. 5b illustrates a second case where the top luma curve has a peak in the middle and where the bottom luma curve also has a peak in the middle. The SAD value is a relatively small value and the ISAD value is a relatively big value, relative to the SAD value. For such case, the respective edge for the top luma curve and the bottom luma curve can be added as a possible edge for use in pixel interpolation with high confidence.

FIG. 5c illustrates a third case where the top luma curve has a negative slope and where the bottom luma curve also has a negative slope. The SAD value is a relatively small value and the ISAD value is a relatively big value, relative to the SAD value. For such case, the respective edge for the top luma curve and the bottom luma curve can be added as a possible edge for use in pixel interpolation with good confidence.

FIG. 5d illustrates a fourth case where the top luma curve has a negative slope and where the bottom luma curve has a positive slope. The SAD value is a relatively large value and the ISAD value is also a relatively large value. For such case, the respective edge for the top luma curve and the bottom luma curve can be identified as invalid, and removed as a possible edge for use in pixel interpolation.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for detecting edges in a video field by a receiver, comprising the steps of:
   selecting edges for a pixel of the video field;
   determining sum of absolute differences ("SAD") values for the selected edges;
   determining inverse SAD ("ISAD") values for the selected edges; and
   detecting one or more certain ones of the selected edges as a valid edge as a function of the determined SAD values and the determined ISAD values,
   wherein the pixel of the video field is interpolated as a function of the detected one or more edges, and
   wherein the interpolated pixel and the video field are displayed by the receiver.

2. The method of claim 1 wherein the determined ISAD values are weighted and wherein the determined SAD values are compared to the weighted ISAD values to detect the one or more edges.

3. The method of claim 1 wherein the selected edges ("e") is a predefined number of edges that intersect the pixel, wherein the pixel has a coordinate position (x, y) in the video field, and wherein a filter range ("d") is applied for determining the determined SAD values and the determined ISAD values.

4. The method of claim 3 wherein the determined SAD values are equal to: $SAD(y, x, e) = |Y(y-1, x+e-d) - Y(y+1, x-e-d)| + 2*|Y(y-1, x+e) - Y(y+1, x-e)| + |Y(y-1, x+e+d) - Y(y+1, x-e+d)|$, wherein the Y(a,b) function is a luminosity function for pixels in the video field.

5. The method of claim 3 wherein the determined ISAD values are equal to: $ISAD(y, x, e) = |Y(y-1, x+e-d) - Y(y+1, x-e)| + |Y(y-1, x+e) - Y(y+1, x-e+d)| + |Y(y-1, x+e) - Y(y+1, x-e-d)| + |Y(y-1, x+e+d) - Y(y+1, x-e)|$, wherein the Y(a,b) function is a luminosity function for pixels in the video field.

6. The method of claim 1 wherein a certain one of the detected one or more edges is used for interpolating the pixel of the video field and wherein the certain one of the detected one or more edges has a minimum SAD value.

7. A method for detecting edges in a video field by a receiver, comprising the steps of:
   selecting edges for a pixel of the video field;
   determining sum of absolute differences ("SAD") values for the selected edges;
   determining inverse SAD ("ISAD") values for the selected edges; and
   detecting one or more certain ones of the selected edges as a valid edge as a function of the determined SAD values and the determined ISAD values,
   wherein the determined ISAD values are weighted and wherein the determined SAD values are compared to the weighted ISAD values to detect the one or more edges,
   wherein the selected edges ("e") is a predefined number of edges that intersect the pixel,
   wherein the pixel has a coordinate position (x, y) in the video field,
   wherein a filter range ("d") is applied for determining the determined SAD values and the determined ISAD values,
   wherein the pixel of the video field is interpolated as a function of the detected one or more edges, and
   wherein the interpolated pixel and the video field are displayed by the receiver.

8. The method of claim 7 wherein the determined SAD values are equal to: $SAD(y, x, e) = |Y(y-1, x+e-d) - Y(y+1, x-e-d)| + 2*|Y(y-1, x+e) - Y(y+1, x-e)| + |Y(y-1, x+e+d) - Y$ (y+1, x−e+d)|, wherein the Y(a,b) function is a luminosity function for pixels in the video field.

9. The method of claim 7 wherein the determined ISAD values are equal to: ISAD(y, x, e)=|Y(y−1, x+e−d)−Y(y+1, x−e)|+|Y(y−1, x+e)−Y(y+1, x−e+d)|+|Y(y−1, x+e)−Y(y+1, x−e−d)|+Y(y−1, x+e+d)−Y(y+1,x−e)|, wherein the Y(a,b) function is a luminosity function for pixels in the video field.

10. The method of claim 7 wherein a certain one of the detected one or more edges is used for interpolating the pixel of the video field and wherein the certain one of the detected one or more edges has a minimum SAD value.

11. A method for detecting edges in a video field by a receiver, comprising the steps of:
   selecting edges for a pixel of the video field;
   determining sum of absolute differences ("SAD") values for the selected edges;
   determining inverse SAD ("ISAD") values for the selected edges; and
   detecting one or more certain ones of the selected edges as a valid edge as a function of the determined SAD values and the determined ISAD values,
   wherein the selected edges ("e") is a predefined number of edges that intersect the pixel,
   wherein the pixel has a coordinate position (x, y) in the video field,
   wherein a filter range ("d") is applied for determining the determined SAD values and the determined ISAD values,
   wherein the determined SAD values are equal to:

$$SAD(y,x,e)=|Y(y-1,x+e-d)-Y(y+1,x-e-d)|+2*|Y(y-1,x+e)-Y(y+1,x-e)|+|Y(y-1,x+e+d)-Y(y+1,x-e+d)|,$$

wherein the determined ISAD values are equal to:

$$ISAD(y,x,e)=Y(y-1,x+e-d)-Y(y+1,x-e)|+|Y(y-1,x+e)-Y(y+1,x-e+d)|+|Y(y-1,x+e)-Y(y+1,x-e-d)|+Y(y-1,x+e+d)-Y(y+1,x-e)|, \text{ and}$$

wherein the Y(a,b) function is a luminosity function for pixels in the video field,
   wherein the pixel of the video field is interpolated as a function of the detected one or more edges, and
   wherein the interpolated pixel and the video field are displayed by the receiver.

12. The method of claim 11 wherein the determined ISAD values are weighted and wherein the determined SAD values are compared to the weighted ISAD values to detect the one or more edges.

13. The method of claim 11 wherein a certain one of the detected one or more edges is used for interpolating the pixel of the video field and wherein the certain one of the detected one or more edges has a minimum SAD value.

* * * * *